(12) United States Patent
Kitatani

(10) Patent No.: US 9,407,750 B2
(45) Date of Patent: Aug. 2, 2016

(54) TERMINAL DEVICE, INFORMATION PROCESSING METHOD AND PROGRAM

(71) Applicant: NEC CASIO Mobile Communications, Ltd., Kawasaki-shi, Kanagawa (JP)

(72) Inventor: Kenichi Kitatani, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/434,310

(22) PCT Filed: Oct. 7, 2013

(86) PCT No.: PCT/JP2013/077263
§ 371 (c)(1),
(2) Date: Apr. 8, 2015

(87) PCT Pub. No.: WO2014/057912
PCT Pub. Date: Apr. 17, 2014

(65) Prior Publication Data
US 2015/0271310 A1    Sep. 24, 2015

(30) Foreign Application Priority Data

Oct. 12, 2012 (JP) .................... 2012-226498

(51) Int. Cl.
*H04M 1/725* (2006.01)
*H04B 5/00* (2006.01)
*H04W 4/00* (2009.01)
*H04W 4/02* (2009.01)

(52) U.S. Cl.
CPC ........... *H04M 1/7253* (2013.01); *H04B 5/0031* (2013.01); *H04B 5/0037* (2013.01); *H04M 1/72572* (2013.01); *H04W 4/008* (2013.01); *H04W 4/026* (2013.01); *H04M 2250/04* (2013.01); *H04M 2250/52* (2013.01)

(58) Field of Classification Search
CPC ...................................................... H04M 1/7253
USPC ................................................. 455/41.1–41.3
See application file for complete search history.

(56) References Cited

U.S. PATENT DOCUMENTS 8,634,871 B2 * 1/2014 Mitsunaga ................. 455/556.1

FOREIGN PATENT DOCUMENTS

| EP | 2211480 A1 | 7/2010 | |
|---|---|---|---|
| JP | 2002169645 A | 6/2002 | |
| JP | 2003163739 A | 6/2003 | |
| JP | 2005328130 A | 11/2005 | |
| JP | 2006345016 | * 12/2006 | ............. G06K 19/00 |
| JP | 2006345016 A | 12/2006 | |
| JP | 2007-053424 A | 3/2007 | |
| JP | 2007-300579 A | 11/2007 | |

(Continued)

OTHER PUBLICATIONS

International Search Report for PCT Application No. PCT/JP2013/077263, mailed on Nov. 12, 2013.

(Continued)

*Primary Examiner* — Tuan H Nguyen

(57) ABSTRACT

A terminal device includes: a determination unit that determines whether a user intends to use a non-contact reception function based on information indicating a state of a terminal device to output a determination result; and a display unit that displays a mark to be used for alignment between the terminal device and the opposed device based on the determination result.

13 Claims, 17 Drawing Sheets

(56) References Cited

FOREIGN PATENT DOCUMENTS

| | | |
|---|---|---|
| JP | 2008-092304 A | 4/2008 |
| JP | 2011034196 A | 2/2011 |
| JP | 2011166630 A | 8/2011 |
| WO | 2008/039559 A1 | 4/2008 |
| WO | 2013/040605 A2 | 3/2013 |

OTHER PUBLICATIONS

Extended European Search Report for EP Application No. EP13845980.5 dated May 3, 2016.

* cited by examiner

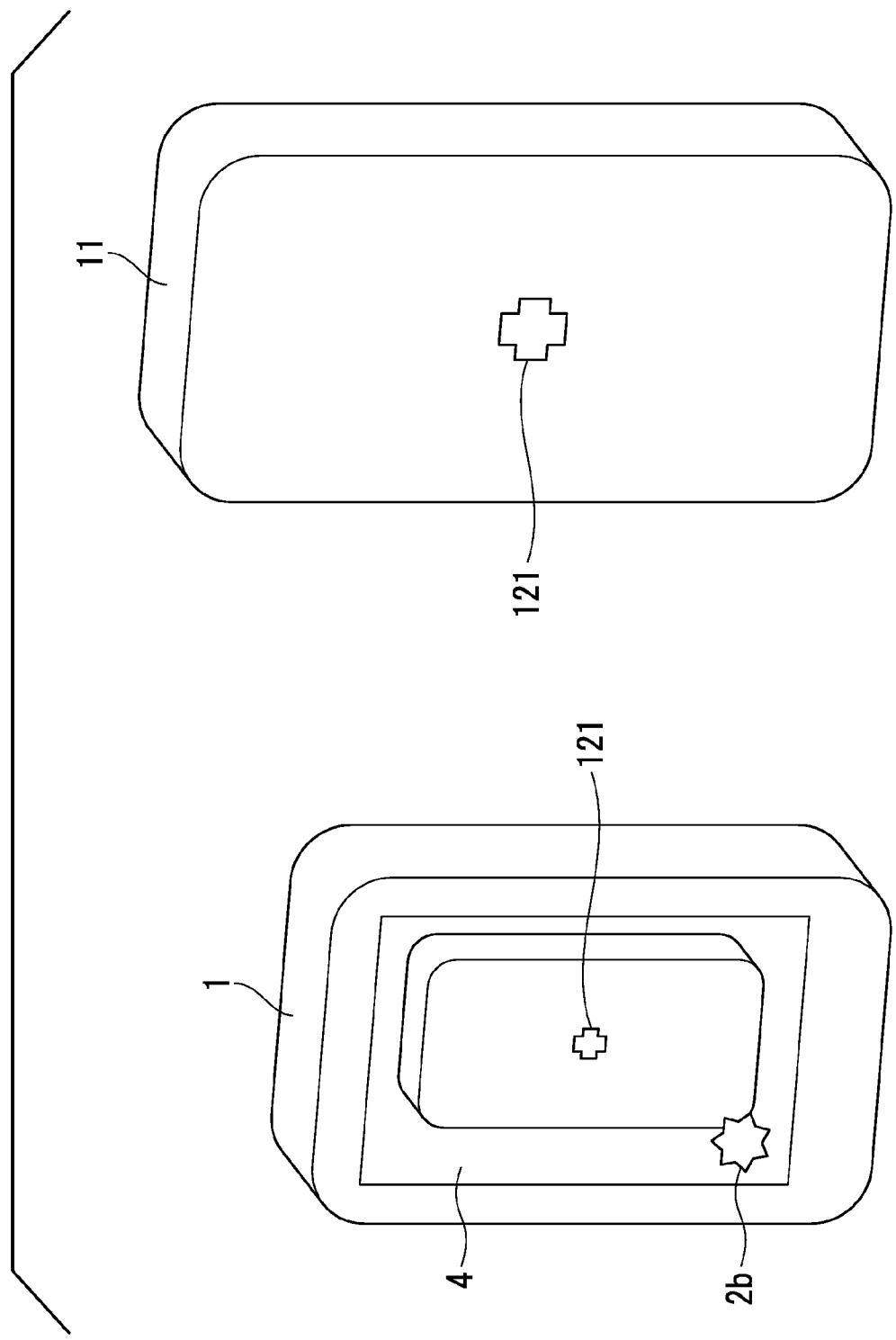

TERMINAL DEVICE, INFORMATION PROCESSING METHOD AND PROGRAM

This application is a National Stage Entry of PCT/JP2013/077263 filed on Oct. 7, 2013, which claims priority from Japanese Patent Application 2012-226498 filed on Oct. 12, 2012, the contents of all of which are incorporated herein by reference, in their entirety.

TECHNICAL FIELD

The present invention relates to a terminal device, an information processing method, and a program.

BACKGROUND ART

Technologies utilizing non-contact reception functions such as non-contact communication between a non-contact integration circuit (IC) and a reader/writer using radio frequency identification (RFID) technology, infrared communication between mobile phones, and a wireless power feeding process of supplying energy to a battery of a smartphone have become widespread. For example, the technologies utilizing the non-contact reception functions are disclosed in Patent Documents 1 to 3.

Using the technology utilizing the non-contact communication which is an example of the non-contact reception function, a user can smoothly pass through a ticket gate of a station and board an electric train by bringing a card having a non-contact IC close to the reader/writer at the ticket gate.

Using the technology utilizing the infrared communication, which is one non-contact reception function, a user can exchange information such as a mail address by juxtaposing mobile phones such that they can perform infrared communication.

Using the technology utilizing the wireless power feeding, which is one non-contact reception function, a user can charge a battery of his or her mobile phone without use of a power cord.

However, there is directivity in radio waves for use in the non-contact reception functions such as the non-contact communication, the infrared communication, and the wireless power feeding and there is a limit in a communicable range. Thus, alignment is necessary between a terminal device to be handled by the user and an opposed device which is a target of the non-contact reception function to be performed by the terminal device.

When the terminal device performs the infrared communication with the opposed device in the technology disclosed in Patent Document 1, a radiation position mark indicating a radiation direction of infrared light is displayed on a screen of the terminal device and alignment for the opposed device is performed based on the mark.

When communication is performed between the non-contact IC mounted on the terminal device and the opposed device in the technology of Patent Document 2, the alignment of the terminal device for the opposed device is performed and communication is initiated when the two devices enter a communicable area.

In the technology of Patent Document 3, a posture of the terminal device is sensed and non-contact IC power supply is cut off according to the posture. Thereby, an operation is limited so that the terminal device does not respond even when the reader/writer is close and security is improved.

PRIOR ART DOCUMENTS

Patent Document

[Patent Document 1]
Japanese Unexamined Patent Application, First Publication No. 2007-53424
[Patent Document 2]
Japanese Unexamined Patent Application, First Publication No. 2007-300579
[Patent Document 3]
Japanese Unexamined Patent Application, First Publication No. 2008-92304

SUMMARY OF THE INVENTION

Problem to be Solved by the Invention

In the technology of the above-described Patent Document 1, the user consciously performs selection of using the non-contact reception function. In response to a user operation, a mark serving as an indication of alignment of the terminal device with the opposed device when alignment of the terminal device with the opposed device is performed is displayed on the display unit.

Thus, in the case where the user uses the technology of Patent Document 1, when the terminal device is aligned with the opposed device, it is necessary for the user to consciously perform a certain operation to cause the mark serving as the indication of the alignment to be displayed on a screen of the terminal device.

Therefore, there is a problem in that convenience is degraded when the user performs the alignment of the terminal device with the opposed device.

In the technology of the above-described Patent Document 2, it is determined that the terminal device has entered the communicable area with the opposed device according to a size of a target mark depicted on an antenna installation surface in the opposed device.

Thus, the terminal device needs to record information about of a shape or size of the target mark on the storage unit in advance. As a result, there is a problem in that the technology of the above-described Patent Document 2 is not available when an opposed device is being used for the first time and the shape or size of the target mark is unknown.

The technology disclosed in the above-described Patent Document 3 is not technology for performing alignment of the terminal device with the opposed device when communication between the non-contact IC mounted on the terminal device and the opposed device is performed.

The technology disclosed in Patent Document 3 is technology for sensing a posture of the terminal device and cutting off the non-contact IC power supply according to the posture. That is, the technology disclosed in Patent Document 3 is not technology for sensing the posture of the terminal device and automatically performing a display of the mark serving as the indication of alignment on the screen of the terminal device.

Thus, even when the technology of Patent Document 3 is applied to the technology of Patent Documents 1 or 2, it is impossible to solve the problem that convenience is degraded when the user performs the alignment of the terminal device with the opposed device.

An exemplary object of the present invention is to provide a terminal device, an information processing method, and a program capable of solving the above-described problem.

Means for Solving the Problem

A terminal device according to an exemplary aspect of the present invention includes: a determination unit that determines whether a user intends to use a non-contact reception function based on information indicating a state of a terminal device to output a determination result; and a display unit that displays a mark to be used for alignment between the terminal device and the opposed device based on the determination result.

An information processing method according to an exemplary aspect of the present invention includes: determining whether a user intends to use a non-contact reception function based on information indicating a state of a terminal device to output a determination result; and displaying a mark to be used for alignment between the terminal device and an opposed device based on the determination result.

A program according to an exemplary aspect of the present invention causes a computer of a terminal device to function as: a determination unit that determines whether a user intends to use a non-contact reception function based on information indicating a state of the terminal device to output a determination result; and a display unit that displays a mark to be used for alignment between the terminal device and an opposed device based on the determination result.

Effect of the Invention

According to the present invention, without a user consciously performing a user operation, a mark serving as an indication of alignment is displayed on a screen of a terminal device and alignment of the terminal device with an opposed device can be performed.

BRIEF DESCRIPTION OF THE DRAWINGS

FIG. 5 is a diagram showing a display example of a display unit when a user performs alignment of the terminal device and an opposed device, in the terminal device according to the first exemplary embodiment of the present invention.

EMBODIMENTS FOR CARRYING OUT THE INVENTION

First Exemplary Embodiment

Figure 1:
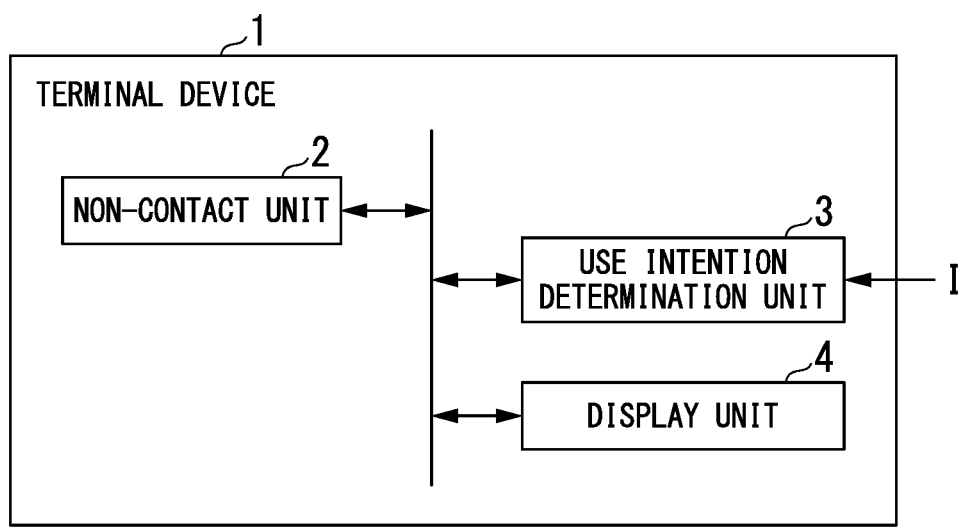
FIG. 1 is a functional block diagram showing a minimum configuration of a terminal device according to an exemplary embodiment of the present invention.

FIG. 1 is a functional block diagram showing a minimum configuration of a terminal device 1 according to an exemplary embodiment of the present invention.

As shown in FIG. 1, the terminal device 1 includes at least a non-contact unit 2, a use intention determination unit (hereinafter sometimes simply referred to as a "determination unit") 3, and a display unit 4.

The non-contact unit 2 includes a non-contact IC, and the non-contact unit 2 is a functional unit for receiving either or both of a signal and energy from an opposed device 11 which is a target of a non-contact reception function. In addition, the non-contact unit 2 is a functional unit for transmitting either or both of a signal and energy to the opposed device 11. The non-contact reception function is a function of receiving either or both of a signal and energy in a non-contact manner.

The determination unit 3 is a functional unit for determining whether a user intends to use the non-contact reception function based on a state of the terminal device 1. The determination unit 3 acquires information I indicating the state of the terminal device 1.

The display unit 4 is a functional unit for providing the user with information necessary for alignment between the terminal device 1 and the opposed device 11 when the non-contact reception function is used.

Figure 2:
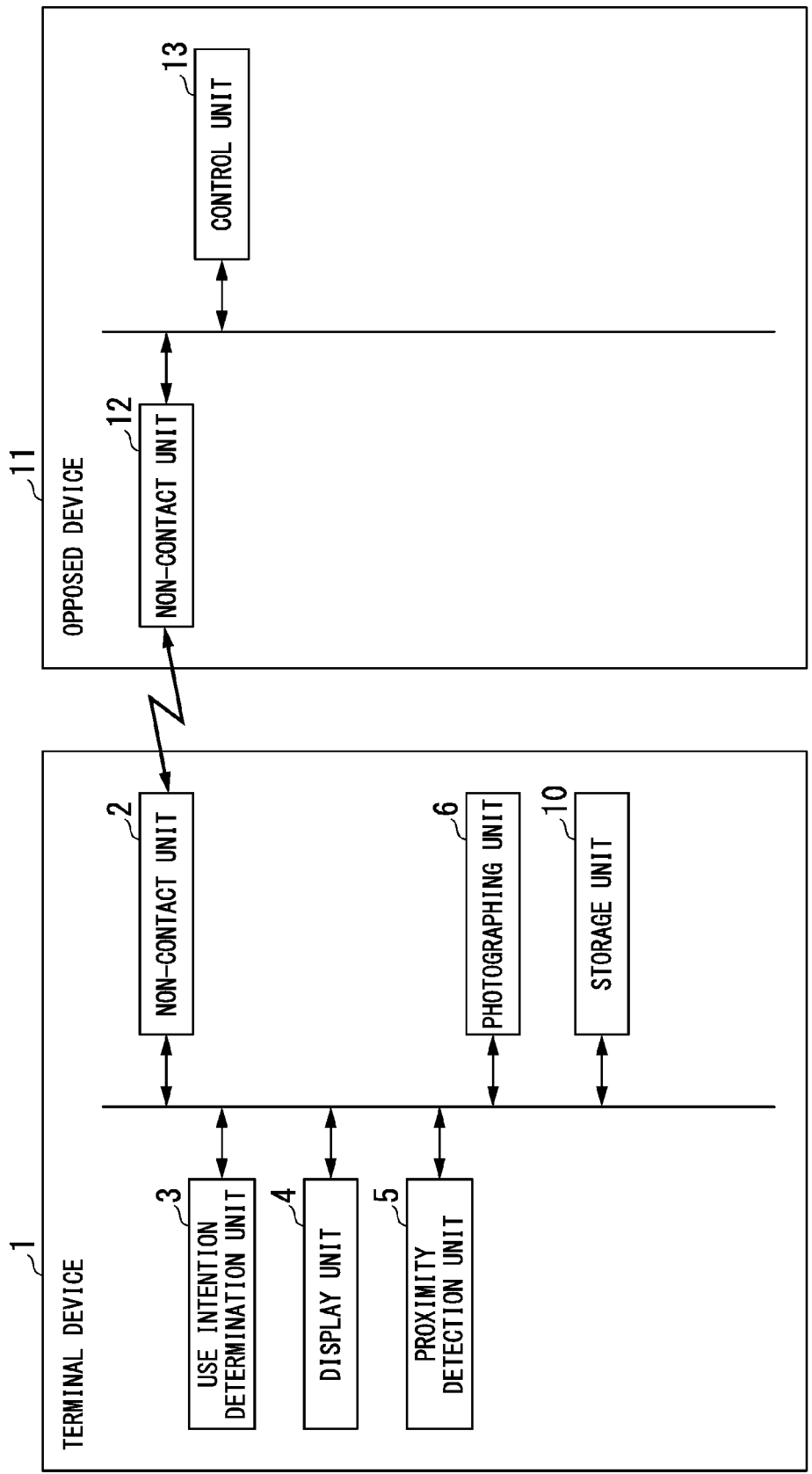
FIG. 2 is a functional block diagram showing a configuration of a terminal device according to a first exemplary embodiment of the present invention.

FIG. 2 is a functional block diagram showing a configuration of the terminal device 1 according to a first exemplary embodiment of the present invention.

The terminal device 1 according to the first exemplary embodiment of the present invention includes functional units of the non-contact unit 2, a use intention determination unit 3, a display unit 4, a proximity detection unit 5, a photographing unit 6, and a storage unit 10 as shown in FIG. 2. The functional units of the determination unit 3, the proximity detection unit 5, and the photographing unit 6 are configured in the terminal device 1A by control unit (for example, CPU) of the terminal device 1 executing a program, for example.

The non-contact unit 2 is a functional unit by which the terminal device 1 receives the signal or energy from the opposed device 11 which is a target of the non-contact reception function. In addition, the non-contact unit 2 is a functional unit for transmitting the signal or energy to the opposed device 11.

The determination unit 3 is a functional unit for determining whether the user intends to use the non-contact reception function based on the state of the terminal device 1.

At the time of alignment between the terminal device 1 and the opposed device 11 when the non-contact function is used, the display unit 4 displays a non-contact unit mark 2b and an image captured by the photographing unit 6. The non-contact unit mark 2b is a virtual position of the non-contact unit 2.

The display unit 4, for example, may be an electrostatic capacitive touch panel. The display unit 4 has a function of performing display by a liquid crystal display (LCD, liquid crystal display device), an organic EL display, or the like and a function as an electrostatic capacitive sensor for sensing information of a screen position in proximity to or in contact with a hand, a pen, or the like.

The terminal device 1 may have a function of prompting the user to move the terminal device 1 using a speaker or the like.

The proximity detection unit 5 is a functional unit for detecting an area in proximity to or in contact with a body for the terminal device 1.

The proximity detection unit 5, for example, may be a large number of electrostatic capacitive sensors installed on the surface of the display unit 4. The proximity detection unit 5 may use an electrostatic capacitive sensor of the display unit 4. The proximity detection unit 5 may be provided on an outer frame of the display unit 4. The proximity detection unit 5 compares each of electrostatic capacitance values of a plurality of electrostatic capacitive sensors to a predetermined threshold value. Then, the proximity detection unit 5 detects an area of a hand of the user in proximity to or in contact with the terminal device 1 based on an area of the display unit 4 including the electrostatic capacitive sensors indicating a value exceeding the threshold value.

The photographing unit 6 is a functional unit for photographing a target mark 121 or the like and outputting the photographed image data to the display unit 4. The target mark 121 indicates a position of a non-contact unit 12 provided in the opposed device 11.

The storage unit 10 stores various types of necessary information.

As shown in FIG. 2, the opposed device 11 according to this exemplary embodiment includes functional units of the non-contact unit 12 and a control unit 13. By the control unit 13 executing the program, various necessary functional units are configured in the opposed device 11.

The non-contact unit 12 is a functional unit for receiving either or both of the signal and the energy from the terminal device 1. In addition, the non-contact unit 12 is functional unit for transmitting either or both of the signal and the energy to the terminal device 1. The non-contact unit 12, for example, may be configured by a non-contact communication antenna.

Figure 3A:
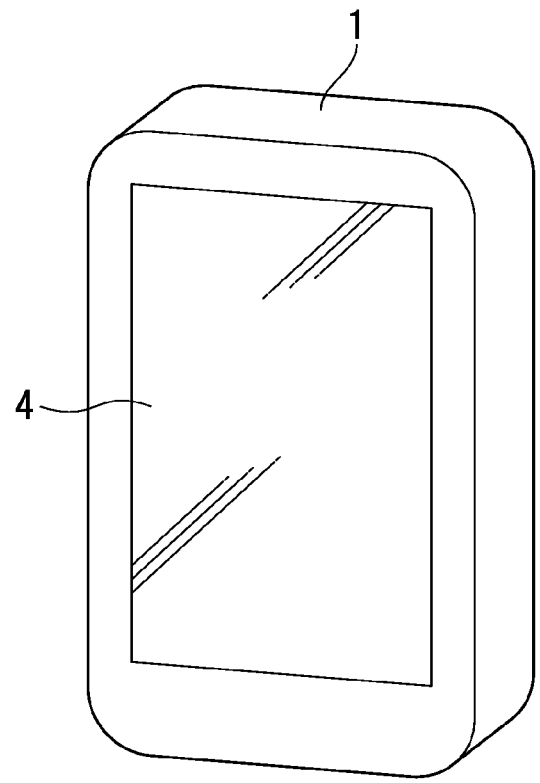
FIG. 3A is a diagram showing an example of an exterior of the terminal device according to the first exemplary embodiment of the present invention.
Figure 3B:
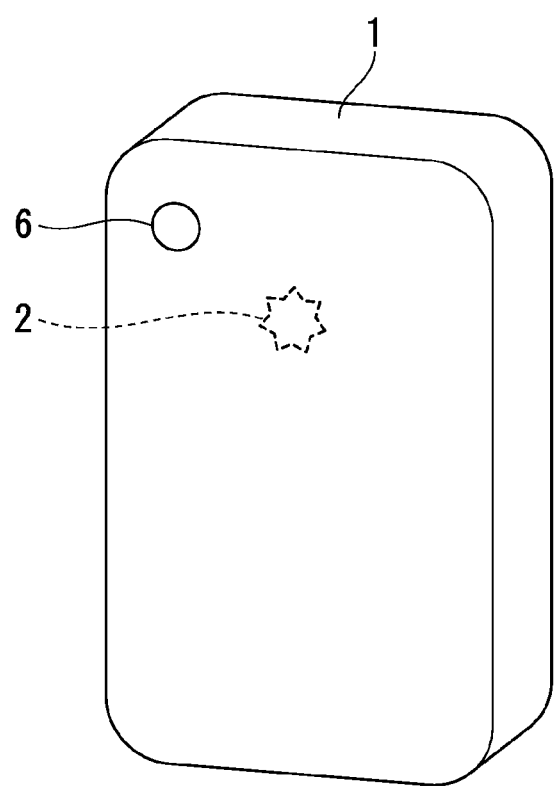
FIG. 3B is a diagram showing an example of an exterior of the terminal device according to the first exemplary embodiment of the present invention.

FIGS. 3A and 3B are diagrams showing examples of the exterior of the terminal device 1 according to the first exemplary embodiment of the present invention.

FIG. 3A is an exterior diagram of a front surface of the terminal device 1. FIG. 3B is an exterior diagram of a rear surface of the terminal device 1.

In this exemplary embodiment, the non-contact unit 2 is disposed inside the terminal device 1 on a slightly upper side of the center of the rear surface, in a manner such as a position of a dashed star indicated in FIG. 3B. However, the layout of the non-contact unit 2 is not limited thereto.

In this exemplary embodiment, the photographing unit 6 is disposed at an upper left position when the terminal device 1 is viewed from the rear surface. However, the layout of the photographing unit 6 is not limited thereto.

Figure 4A:
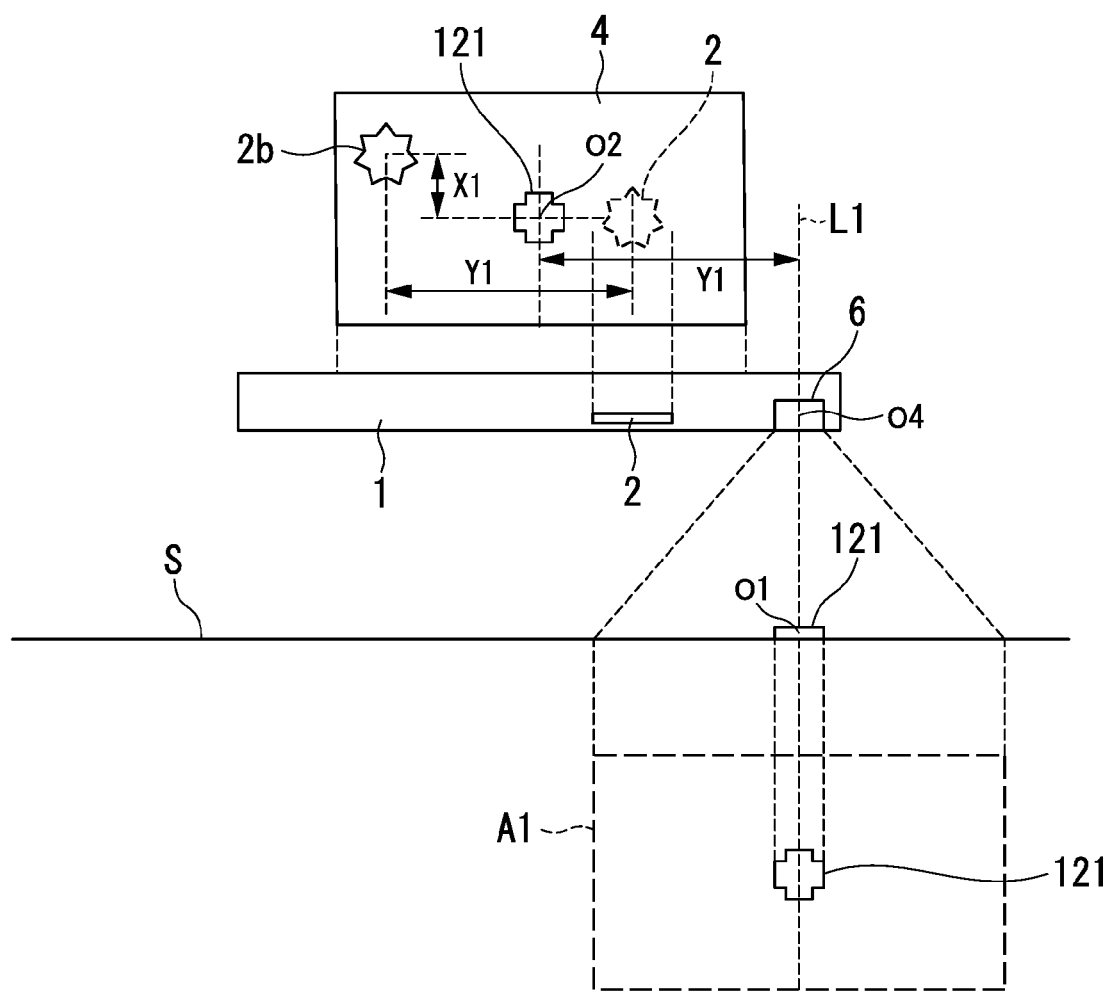
FIG. 4A is a diagram showing a processing outline of the terminal device according to the first exemplary embodiment of the present invention.
Figure 4B:
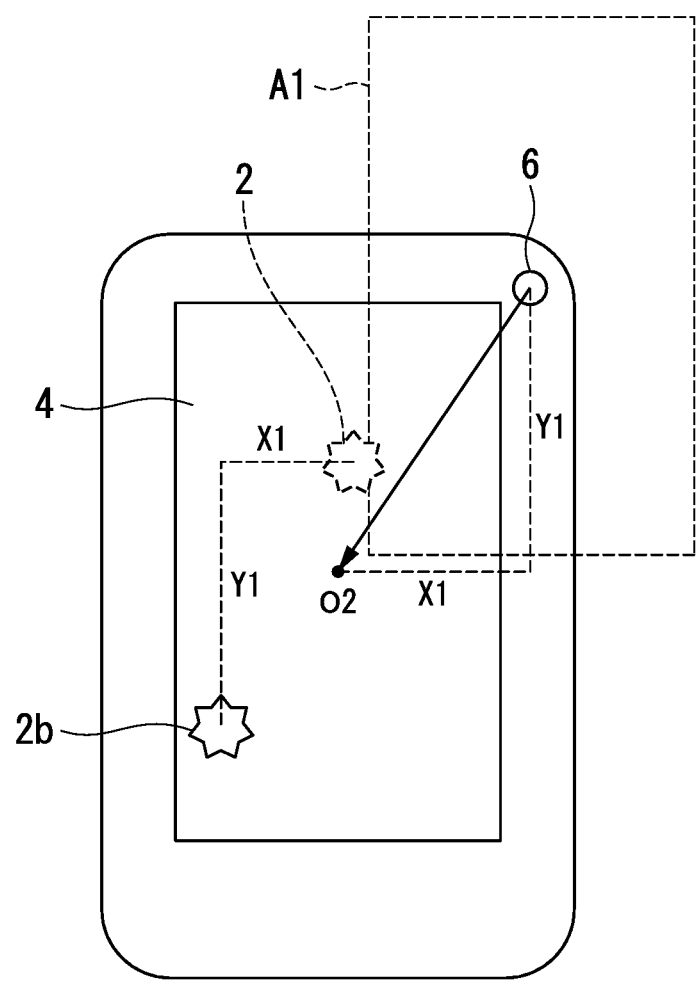
FIG. 4B is a diagram showing a processing outline of the terminal device according to the first exemplary embodiment of the present invention.

FIGS. 4A and 4B are diagrams showing a processing outline of the terminal device 1 according to the first exemplary embodiment of the present invention.

FIG. 4A shows an example of a state in which the photographing unit 6 is positioned directly above a target mark 121 marked in a surface S of the opposed device 11 when the terminal device 1 and the opposed device 11 are viewed from directly therebeside. FIG. 4B shows a display example of a non-contact unit mark 2b in the display unit 4.

As showing in FIG. 4A, a photographing region A1 photographed by the photographing unit 6 of the terminal device 1 is a region in which a position at which a center line L1 of a photographing range of the photographing unit 6 and the surface S of the opposed device 11 meet is set as a center o1. The display unit 4 displays an image in which the center o1 of the photographing region A1 is positioned in a center o2 of the display unit 4.

The terminal device 1 includes the non-contact unit 2 as described above. A position of the non-contact unit 2 provided in the terminal device 1 and a position o4 of the photographing unit 6 provided in the terminal device 1 are separated by a distance X1 in a horizontal direction of the terminal device 1 and a distance Y1 in a vertical direction of the terminal device 1. Accordingly, in a state in which photographing has been performed so that the target mark 121 is positioned in the center o1 of the photographing region A1, the position of the target mark 121 is a position corresponding to the position o4 of the photographing unit 6. That is, in this state, there is no target mark 121 at a position corresponding to (facing) the position of the non-contact unit 2. Therefore, in this state, communication with the opposed device 11 is difficult or communication efficiency of the non-contact reception function is degraded because it is separated from the opposed device 11.

Therefore, the terminal device 1 in this exemplary embodiment displays the non-contact unit mark 2b at a correction position moved by a distance −X1 in the horizontal direction and a distance −Y1 in the vertical direction from the actual position of the non-contact unit 2.

By displaying the non-contact unit mark 2b in this manner, the actual position of the non-contact unit 2 matches the position of the target mark 121 when the user aligns the non-contact unit mark 2b and the target mark 121.

FIG. 5 is a diagram showing a display example of the display unit 4 when the user performs alignment of the terminal device 1 and the opposed device 11 according to the first exemplary embodiment of the present invention.

As shown in FIG. 5, the display unit 4 displays the target mark 121 serving as the indication of the alignment at the correction position.

At this time, the display unit 4 superimposes and displays the non-contact unit mark 2b provided in the terminal device 1 on an image of the opposed device 11 photographed by the photographing unit 6.

The display unit 4 displays the non-contact unit mark 2b only when the determination unit 3 determines that the user intends to use the non-contact reception function.

The user can perform the alignment of the terminal device 1 and the opposed device 11 by moving the terminal device 1 so that the non-contact unit mark 2b displayed by the display unit 4 is superimposed on the target mark of the opposed device 11 on the display unit 4.

Figure 6:
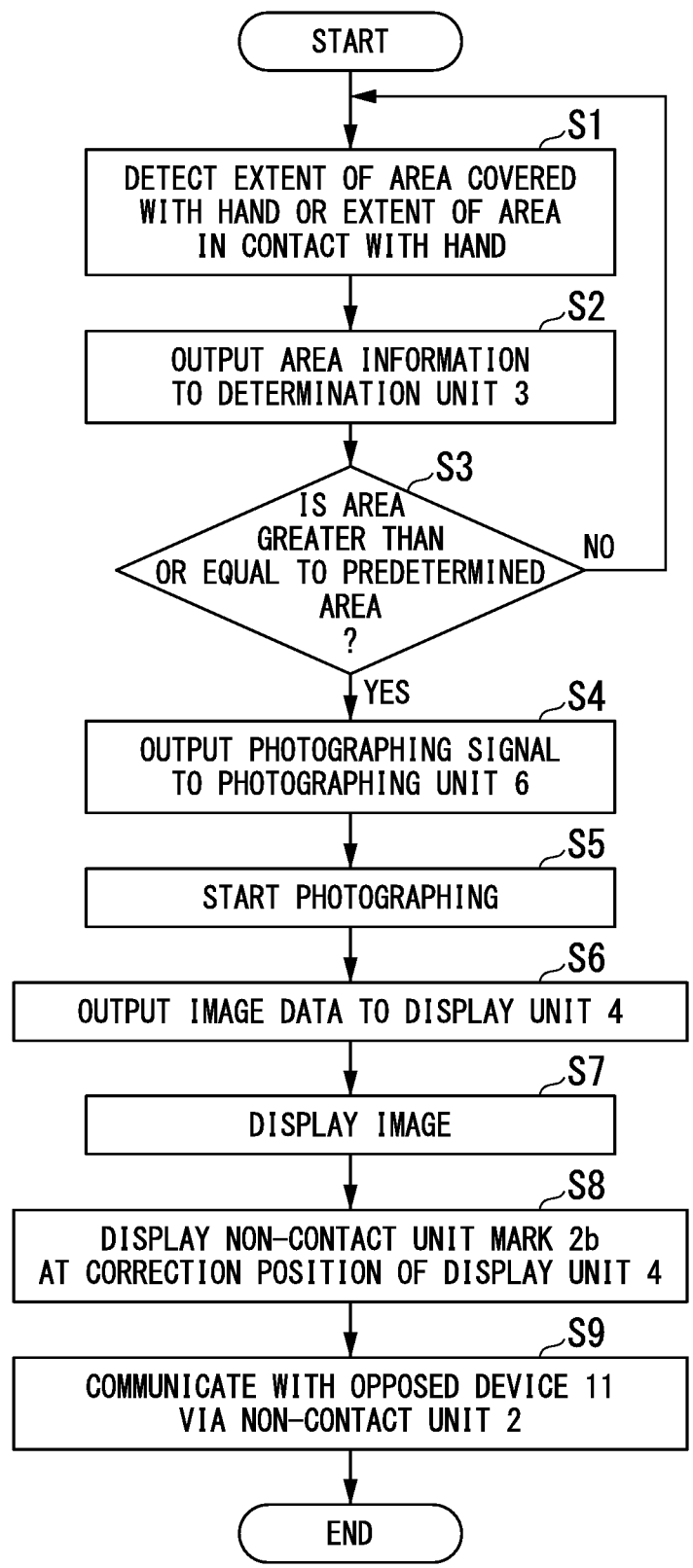
FIG. 6 is a diagram showing a processing flow of the terminal device according to the first exemplary embodiment of the present invention.

FIG. 6 is a diagram showing a processing flow of the terminal device 1 according to the first exemplary embodiment of the present invention.

Next, a processing flow of the terminal device 1 according to the exemplary embodiment will be described with reference to an example in which the user pays money at the time of shopping using the terminal device 1 such as a smartphone provided with an electronic money function. The electronic money function uses non-contact communication which is an example of a non-contact reception function.

When the user purchases a product, payment can be performed by the terminal device 1 equipped with the electronic money function using the non-contact reception function.

When the payment for the product is performed by the terminal device 1, the user first brings his or her hand close to the terminal device 1 so that the terminal device 1 is used in payment for the purchase of the product. Then, the user holds the terminal device 1 in his or her hand and brings the non-contact unit 2 in the terminal device 1 close to the opposed device 11 such as a reader/writer installed in an accounting device.

During that time, the proximity detection unit 5 in the terminal device 1 detects an extent of an area in which the hand close to the terminal device 1 covers a predetermined region excluding the non-contact unit 2 of the terminal device 1 or an extent of an area in which the hand is in contact with the predetermined region (step S1).

As a specific example, the case in which the terminal device 1 is a smartphone will be described. In this case, a plurality of electrostatic capacitive sensors of a touch panel, which is an example of the display unit 4, detect a position at which the user's hand covers the touch panel. The proximity detection unit 5 compares a value of each of electrostatic capacitances of the plurality of electrostatic capacitive sensors to a predetermined threshold value. Then, the proximity detection unit 5 calculates a percent of an area of the touch panel (display unit 4) including the electrostatic capacitive sensor indicating a value exceeding the threshold value for an area of the overall touch panel.

The proximity detection unit 5 outputs the detected area information to the determination unit 3 (step S2).

The determination unit 3 receives an input of the area information detected by the proximity detection unit 5. The determination unit 3 determines whether the covered or contacted area is greater than or equal to a predetermined area based on the area information (step S3).

The determination unit 3 determines that the user intends to use the non-contact reception function when it determines that the covered or contacted area is greater than or equal to the predetermined area (for step S4).

When the determination unit 3 determines that the covered or contacted area is not greater than or equal to the predetermined area, it determines that the user does not intend to use the non-contact reception function and stands by until the next determination on an area detected by the detection unit 5 (returning to step S1).

Accordingly, when the user holds the terminal device 1 in his or her hand and performs an action of bringing the non-contact unit mark 2b displayed on the display unit 4 of the terminal device 1 close to the target mark 121 of the opposed device 11, the determination unit 3 determines that the user intends to use the non-contact reception function at some timing of the user's action.

When the determination unit 3 determines that the user intends to use the non-contact reception function, it outputs a photographing signal for instructing the photographing unit 6 to start photographing to the photographing unit 6 so that the user can identify a position of the target mark 121 in the opposed device 11 (step S4).

The photographing unit 6 starts the photographing in response to an input of the photographing signal (step S5).

The photographing unit 6 outputs the photographed image data to the display unit 4 (step S6).

When the display unit 4 receives an input of the image data, it displays an image based on the image data (step S7).

When the determination unit 3 determines that the user intends to use the non-contact reception function, the non-contact unit mark 2b in the terminal device 1 is displayed at a correction position of the display unit 4 in preparation for alignment of the terminal device 1 and the opposed device 11 to be performed by the user so as to use the non-contact reception function (step S8).

The user horizontally moves a relative position of the terminal device 1 for the opposed device 11 while viewing an image displayed by the display unit 4, and performs alignment so that the non-contact unit mark 2b in the display unit 4 and the target mark 121 are superimposed.

The user performs this alignment so that the terminal device 1 and the opposed device 11 can mutually use the non-contact reception function. The terminal device 1 receives and supplies either or both of a signal and energy with the opposed device 11 via the non-contact unit 2 (step S9).

Then, an accounting process is performed between the terminal device 1 and the accounting device based on a total amount of money for the product to be purchased by the user displayed on the accounting device.

Specifically, first, the opposed device 11 reads the total amount of money displayed on the accounting device. Then, for example, the user brings the terminal device 1 close to the opposed device 11 and communication of the above-described step S9 is performed. Then, the opposed device 11 outputs to the terminal device 1 a subtraction signal for subtracting the total amount of money read from the accounting device from the remainder stored in the storage unit 10 included in the terminal device 1. When the terminal device 1 receives an input of the subtraction signal, it subtracts the total amount of money from the remainder stored by in storage unit 10 and stores the remainder after the subtraction in the storage unit 10.

Figure 7:
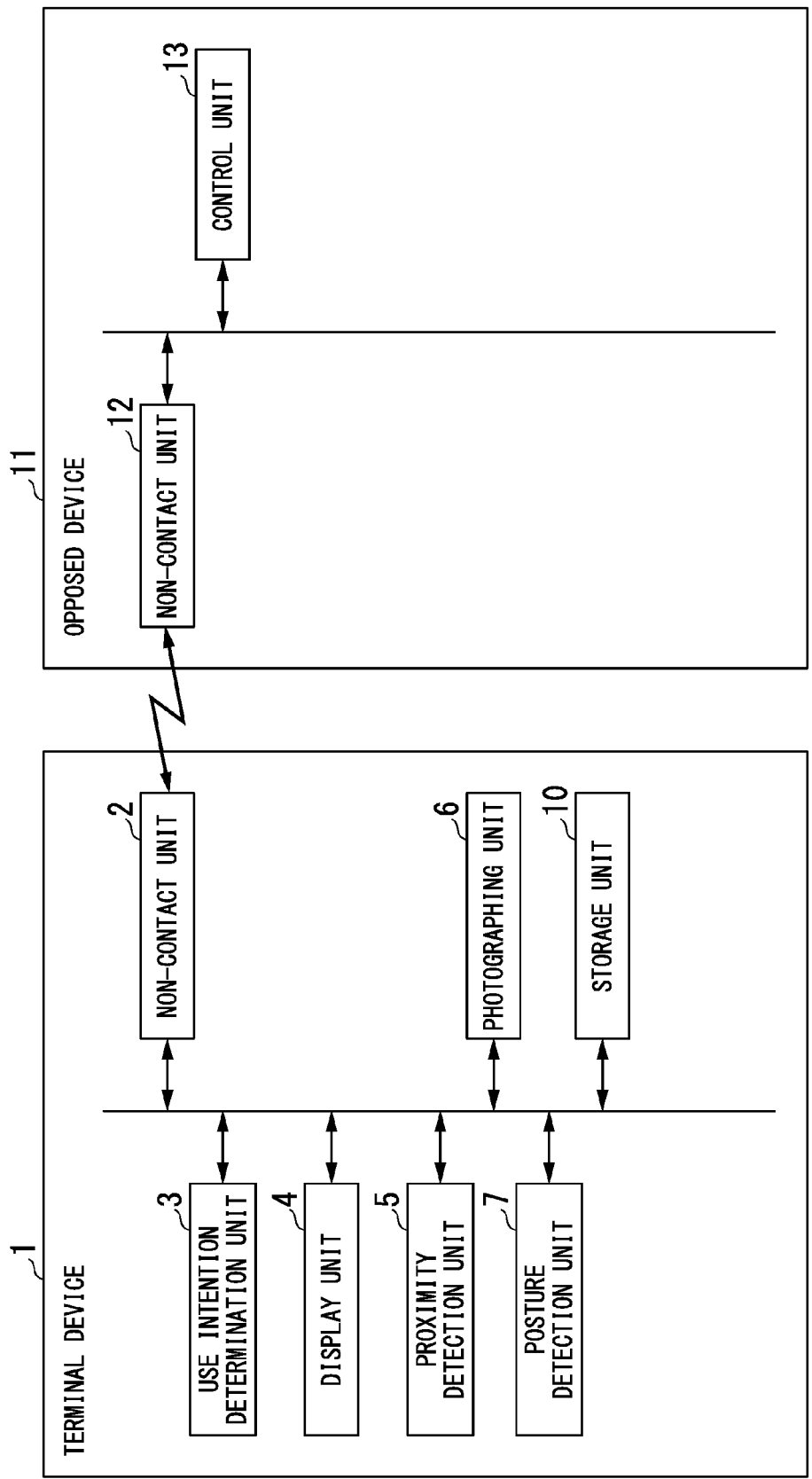
FIG. 7 is a functional block diagram showing a configuration when a posture detection function of the terminal device according to the first exemplary embodiment of the present invention is used.

FIG. 7 is a functional block diagram showing a configuration when a posture detection function of the terminal device 1 according to the first exemplary embodiment of the present invention is used.

The posture detection unit 7 is a functional unit for detecting a horizontal or vertical posture or the like of the terminal device 1 and outputting the detection result to the determination unit 3. The posture detection unit 7, for example, may be configured by an acceleration sensor, a magnetic sensor, or the like.

Figure 8:
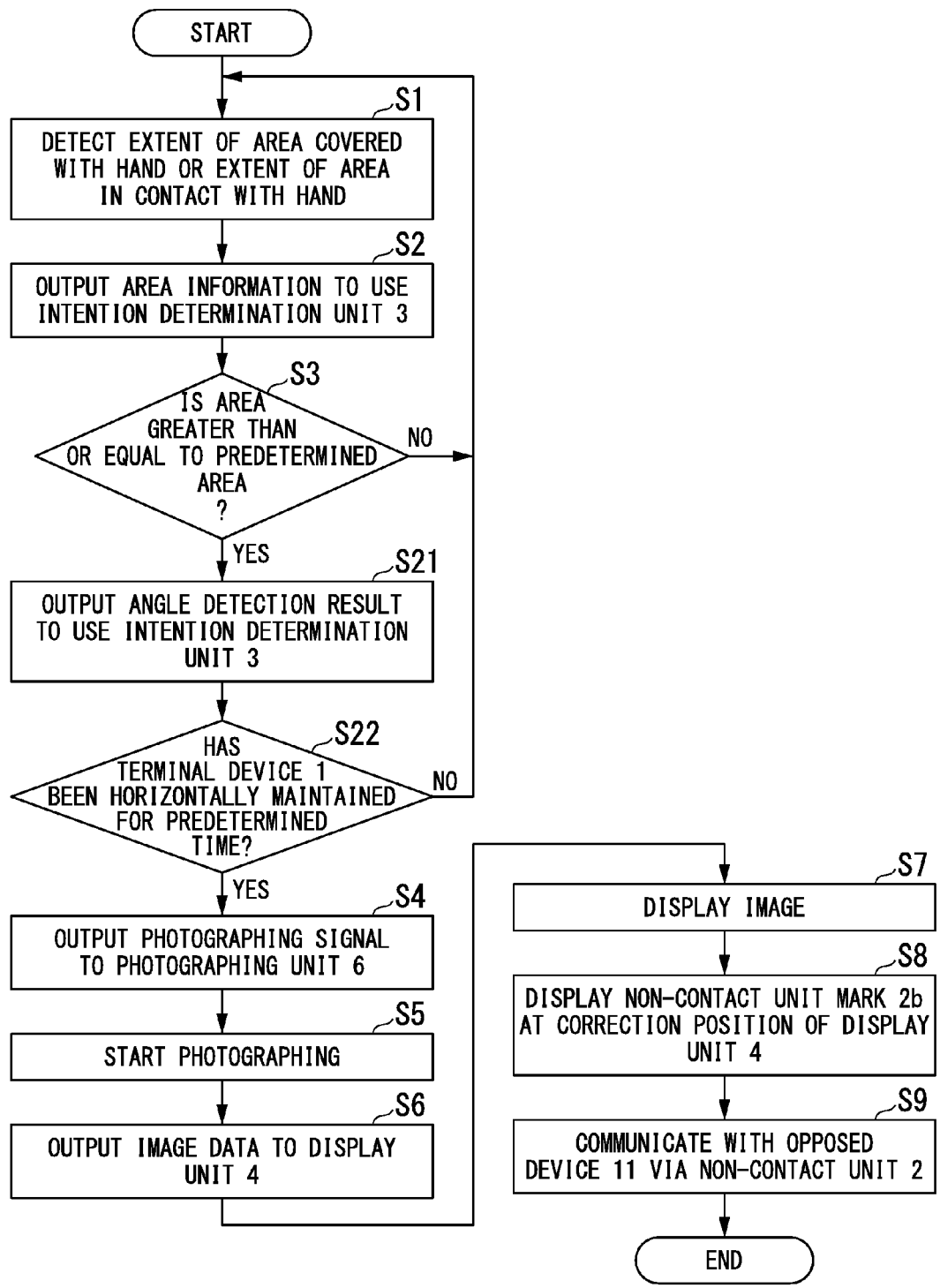
FIG. 8 is a diagram showing a processing flow when the posture detection function of the terminal device according to the first exemplary embodiment of the present invention is used.

FIG. 8 is a diagram showing a processing flow when the posture detection function of the terminal device 1 according to the first exemplary embodiment of the present invention is used.

The determination unit 3 may determine whether the user intends to use the non-contact reception function based on the posture detected by the posture detection unit 7 along with a result of area detection by the proximity detection unit 5.

As a specific example, the case in which the user brings the terminal device 1 horizontally close to the opposed device 11 so as to pay money for a product using electronic money to a shop will be described. In this case, after the above-described process of steps S1 to S3 is performed, the user brings the terminal device 1 horizontally close to the opposed device 11 and horizontally maintains the terminal device 1 for a predetermined time for alignment. At this time, the posture detection unit 7 detects an angle of the terminal device 1 with respect to the horizontal level periodically (for example, for every 0.1 sec), and outputs a detection result of the angle with respect to the horizontal level to the determination unit (step S21).

The determination unit 3 receives an input of the detection result of the angle from the posture detection unit 7. The determination unit 3 determines whether the terminal device 1 is horizontally maintained for a predetermined time based on the detection result of the angle (step S22).

When the determination unit 3 determines that the terminal device 1 is horizontally maintained for the predetermined time, the process of steps S4 to S9 is performed.

When the determination unit 3 determines that the terminal device 1 is not horizontally maintained for the predetermined time, the process returns to step S1.

A specific example of the processing flow of determining whether the user intends to use the non-contact reception function indicated in steps S2 to S22 of FIG. 8 will be described.

For example, the determination unit 3 sets a threshold value to be used to determine whether the user intends to use the non-contact reception function based on a result of area detection by the proximity detection unit 5 at 25% of the overall area of the touch panel (display unit 4). In addition, the determination unit 3 sets the threshold value for determining whether the user intends to use the non-contact reception function based on the result of angle detection by the posture detection unit 7 to a holding time of 2 sec within an angle of 10 degrees with respect to the horizontal level.

As a specific example, when the user brings the terminal device 1 close to the opposed device 11 so as to pay the electronic money to a shop, the proximity detection unit 5 detects that a body covers 30% of the touch panel which is the display unit 4 of the terminal device 1 and outputs a detection result to the determination unit 3 (step S2).

The determination unit 3 compares the detection result (that is, 30%) of the proximity detection unit 5 to the threshold value (that is, 25%). As a result, the determination unit 3 determines that the detection result of the proximity detection unit 5 is greater than the threshold value (step S3).

Next, as a specific example, the posture detection unit 7 detects that the terminal device 1 has maintained its posture for 2 sec at the angle from 5 degrees to 8 degrees with respect to the horizontal level. During the detection, the posture detection unit 7, for example, outputs the detection result every 0.1 second (step S21).

The determination unit 3 receives an input of a detection result for every 0.1 sec from the posture detection unit 7. The determination unit 3 compares the detection results to the threshold value (that is, an angle of 10 degrees). Then, when the comparison result indicating that the detection result is less than the threshold value continues 20 times (2 sec), the determination unit 3 determines that the user intends to use the non-contact reception function (step S22).

The processing flow of the terminal device 1 according to the first exemplary embodiment has been described above. According to the above-described process of the terminal device 1, the non-contact unit mark 2b is displayed at a correction position of the display unit 4 depending on a state of the terminal device 1. Thus, the user can cause the mark serving as the indication of the alignment to be displayed on the screen of the terminal device and can easily perform alignment of the terminal device with the opposed device without consciously performing a user operation.

Second Exemplary Embodiment

Figure 9:
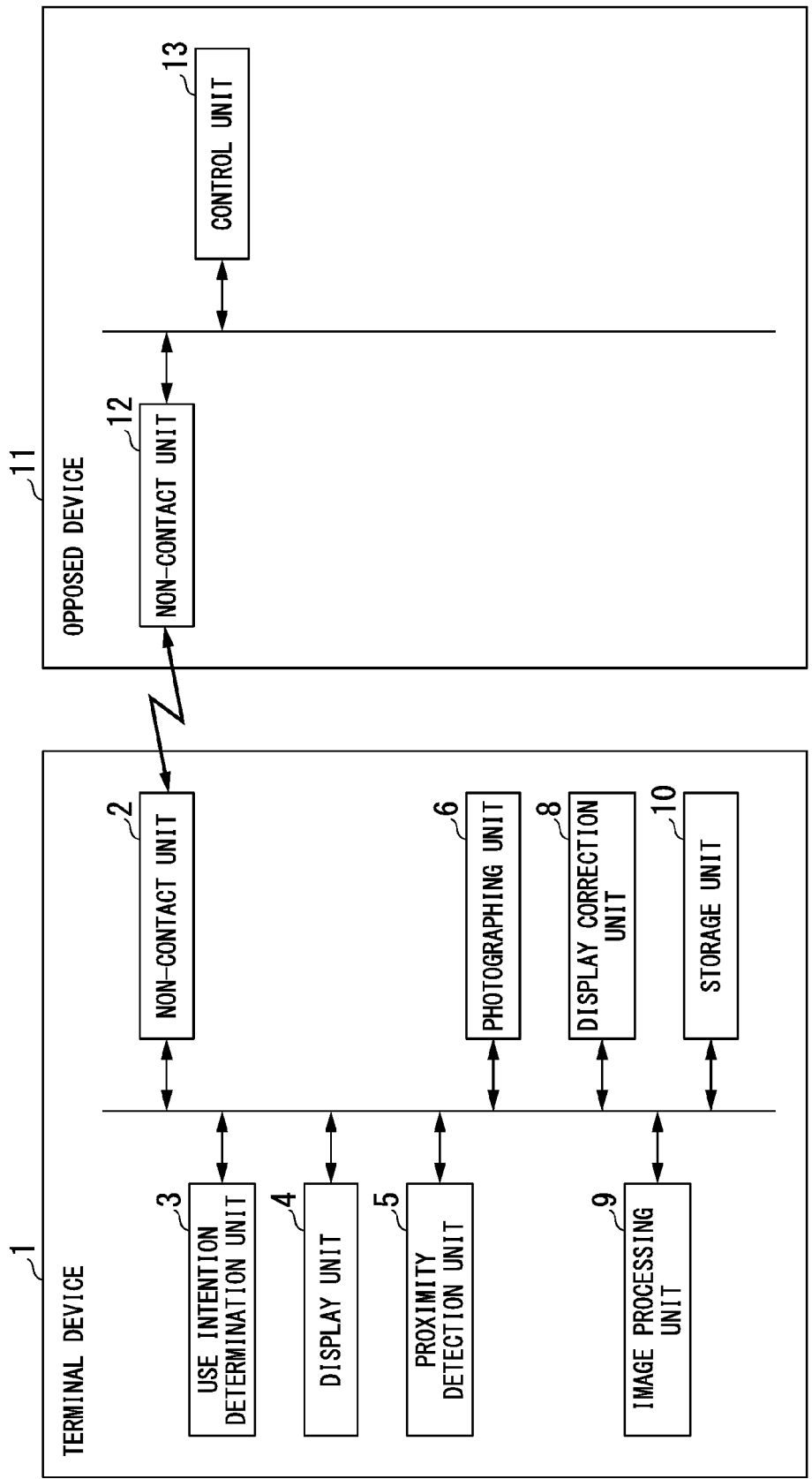
FIG. 9 is a functional block diagram showing a configuration of a terminal device according to a second exemplary embodiment of the present invention.

FIG. 9 is a functional block diagram showing a configuration of a terminal device 1 according to a second exemplary embodiment of the present invention.

The functional block diagram shown in FIG. 9 is a block diagram in which a display correction unit 8 and an image processing unit 9 are added to the functional block representing the configuration of the terminal device 1 in the first exemplary embodiment shown in FIG. 2.

The display correction unit 8 is a functional unit for processing data to perform display on the display unit 4 so that a center o3 of the image representing a center o1 of a photographing region matches an actual position o4 of the photographing unit 6 when the display unit 4 displays an image captured by the photographing unit 6.

The image processing unit 9 is a functional unit for combining images captured by the photographing unit 6 and outputting data thereof to the display unit 4.

By a control unit executing a program, the functional units of the display correction unit 8 and the image processing unit 9 are configured in the terminal device 1.

Figure 10:
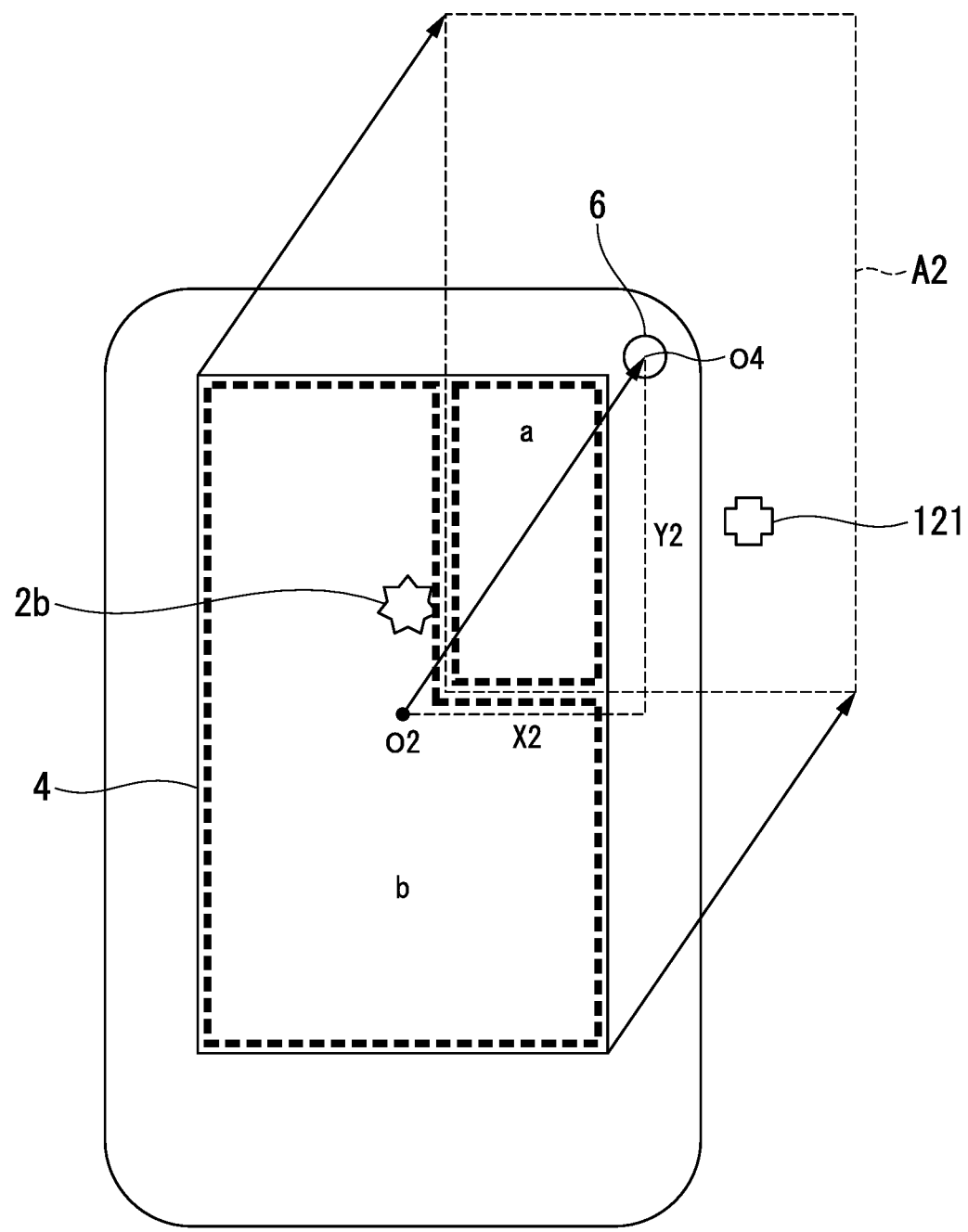
FIG. 10 is a diagram showing a first display example of a display unit provided in the terminal device according to the second exemplary embodiment of the present invention.

FIG. 10 is a diagram showing a display example 1 of the display unit 4 provided in the terminal device 1 according to the second exemplary embodiment of the present invention.

As shown in FIG. 10, the center o2 of the display unit 4 and the position o4 of the photographing unit 6 are separated by a distance X2 in a horizontal direction of the terminal device 1 and a distance Y2 in a vertical direction of the terminal device 1. In this exemplary embodiment, the display correction unit 8 performs a process of horizontally moving original image data and displaying it on the display unit 4 so as to perform display on the display unit 4 such that the center o3 of the image matches the actual position o4 of the photographing unit 6 using the distance X2 and the distance Y2.

In the second exemplary embodiment, the display unit 4 displays the non-contact unit mark 2b at the position of the display unit 4 which falls directly behind the non-contact unit 2.

By performing the display in this manner, the center o3 of the image captured by the photographing unit 6 matches the position o4 of the photographing unit 6. At this time, a region of the image displayed by the display unit 4 is an actually captured image display region indicated by a rectangular region a of a dashed line. A virtually captured image display region indicated by a region b in the display unit 4 is a region in which there is no image information. The size of the virtually captured image display region varies according to a size of the actually captured image display region. In the virtually captured image display region, for example, only the color white may be displayed.

Figure 11:
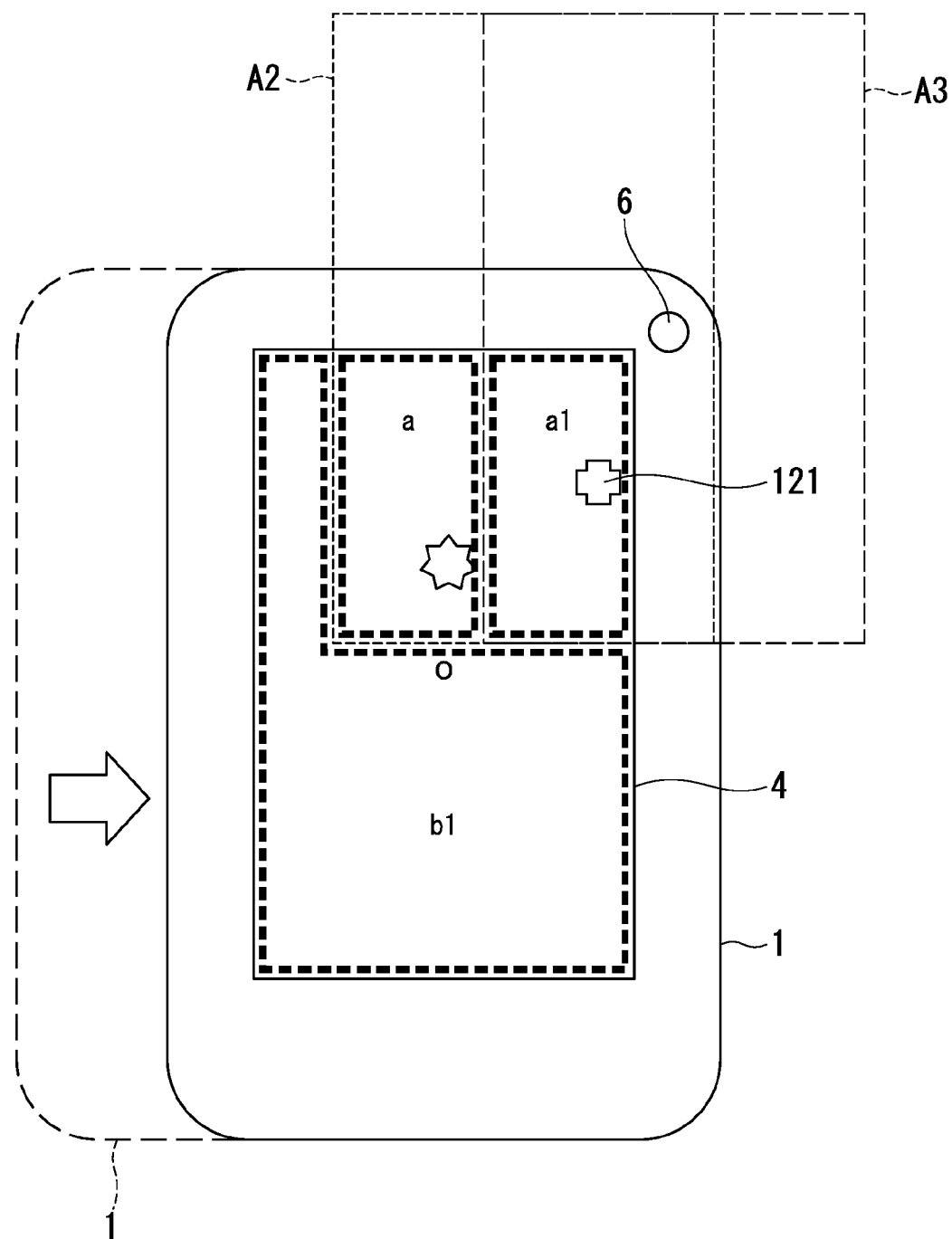
FIG. 11 is a diagram showing a second display example of the display unit provided in the terminal device according to the second exemplary embodiment of the present invention.

FIG. 11 is a diagram showing a display example 2 of the display unit 4 provided in the terminal device 1 according to the second exemplary embodiment of the present invention.

FIG. 11 shows a display example of an image displayed on the display unit 4 when the user has moved the terminal device 1 in a direction of an arrow.

In FIG. 11, the terminal device 1 indicated by a dotted line is the terminal device 1 before movement. In FIG. 11, the terminal device 1 indicated by a solid line is the terminal device 1 after the movement.

When the user has moved the terminal device 1 in the direction of the arrow in a situation in which the display unit 4 displays the region a and the region b for the photographing region A2 of the photographing unit 6 shown in FIG. 10, the photographing unit 6 newly photographs a photographing region A3. Then, the photographing unit 6 outputs the photographed image data to the image processing unit 9.

The image processing unit 9 receives an input of the image data obtained by the photographing of the photographing unit 6. The image processing unit 9 combines image data (image data of a region a1) newly obtained by photographing of the photographing unit 6 after the user moves the terminal device 1 with image data (image data of the region a) obtained by previous photographing. The image processing unit 9 outputs the combined image data to the display unit 4. In FIG. 11, the virtually captured image display region is a region b1 in the display unit 4. The image processing unit 9 repeats this process periodically (for example, for every 0.2 sec). At this time, when the terminal device 1 has been moved to cover the already photographed region, the virtually captured image display region becomes smaller than the region b1. Then, every time the input of the image data is received, the display unit 4 displays its image. Then, the user identifies a position of the target mark 121 while viewing the image displayed by the display unit 4 and performs alignment of the terminal device 1 and the opposed device 11.

A well-known technology may be used for combining of image data to be performed by the image processing unit 9. For example, a feature object such as an appearance or the target mark 121 of the opposed device 11 common between immediately previous image data obtained by photographing of the photographing unit 6 and image data newly obtained by photographing may be extracted, and image data may be combined based on the feature object.

Figure 12:
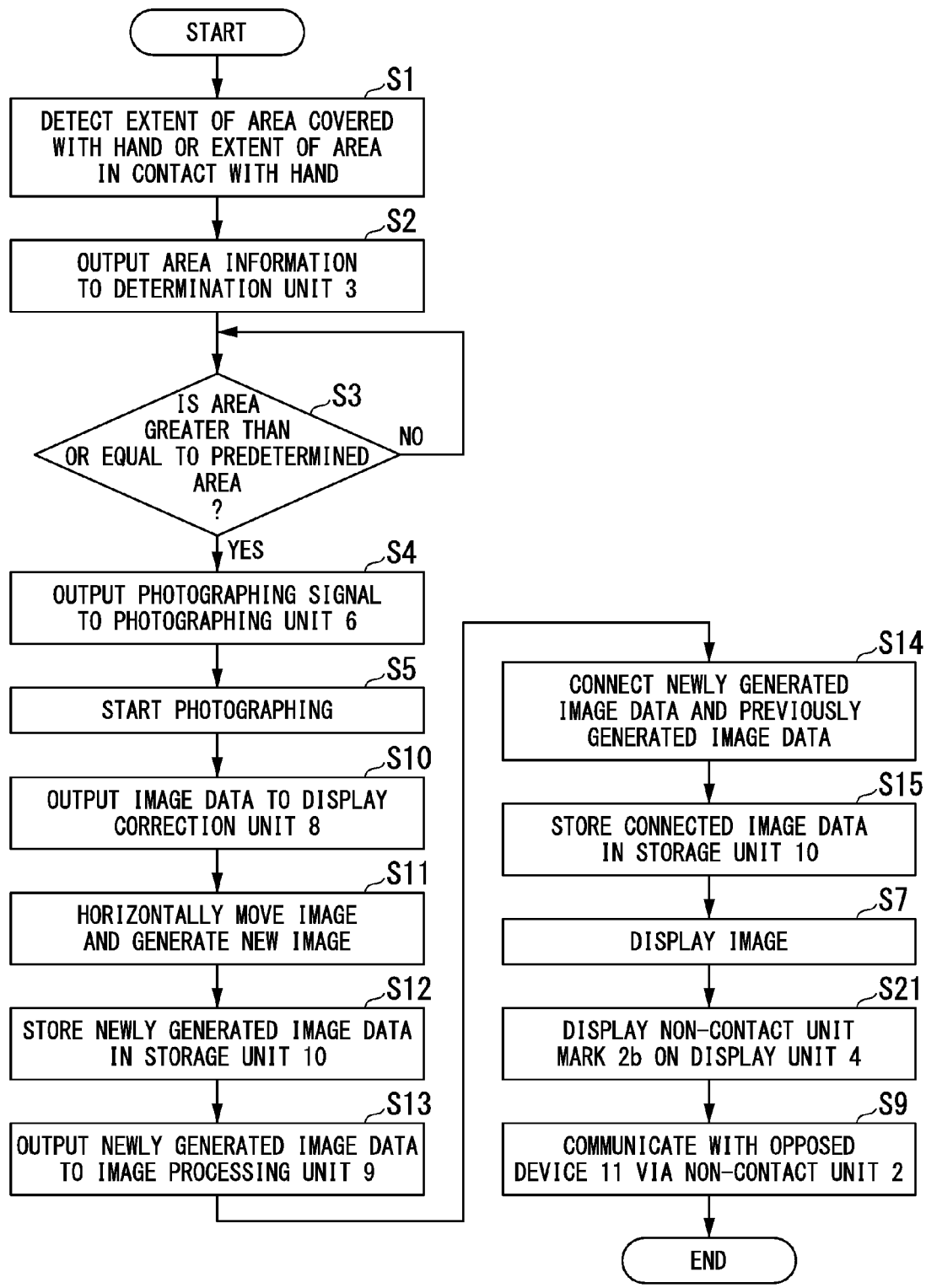
FIG. 12 is a diagram showing a processing flow of the terminal device according to the second exemplary embodiment of the present invention.

FIG. 12 is a diagram showing a processing flow of the terminal device 1 according to the second exemplary embodiment of the present invention.

Next, as with the case of the terminal device 1 according to the first exemplary embodiment, a processing flow of the terminal device 1 according to the second exemplary embodiment will be described with reference to an example in which the user pays money using the terminal device 1 such as a smartphone provided with an electronic money function at the time of shopping.

Except for steps S10 to S15 and step S21 in the processing flow of the terminal device 1 according to the second exemplary embodiment of the present invention, it is the same as the processing flow of the terminal device 1 according to the first exemplary embodiment.

Hereinafter, steps S10 to S15 and step S21 in the processing flow of the terminal device 1 according to the second exemplary embodiment of the present invention will be described.

After the process of steps S1 to S5 is performed as in the processing flow of the terminal device 1 according to the first exemplary embodiment, image data obtained by photographing of the photographing unit 6 is output to the display correction unit 8 (step S10).

The display correction unit 8 receives an input of the image data. The display correction unit 8 horizontally moves an image based on the image data by a distance X2 in the horizontal direction of the terminal device 1 and a distance Y2 in the vertical direction which are distance differences between the center of the display unit 4 and the center of the photographing unit 6, and generates a new image (step S11).

The display correction unit 8 stores image data of the newly generated image in the storage unit 10 (step S12). The display correction unit 8 outputs the newly generated image data to the image processing unit 9 (step S13).

The image processing unit 9 receives an input of the image data newly generated by the display correction unit 8. The image processing unit 9 extracts an image of a feature object common between the newly generated image data and image data previously generated and stored in the storage unit 10, and connects (combines) the two images data based on the image of the feature object (step S14).

The image processing unit 9 stores the connected (combined) image data in the storage unit 10 (step S15).

As in the processing flow of the terminal device 1 according to the first exemplary embodiment, the process of step S7 is performed.

The display unit 4 displays the non-contact unit mark 2b at a position corresponding to an actual position of the non-contact unit 2 on the display unit 4 (step S21).

As in the processing flow of the terminal device 1 according to the first exemplary embodiment, the process of step S9 is performed.

Figure 13:
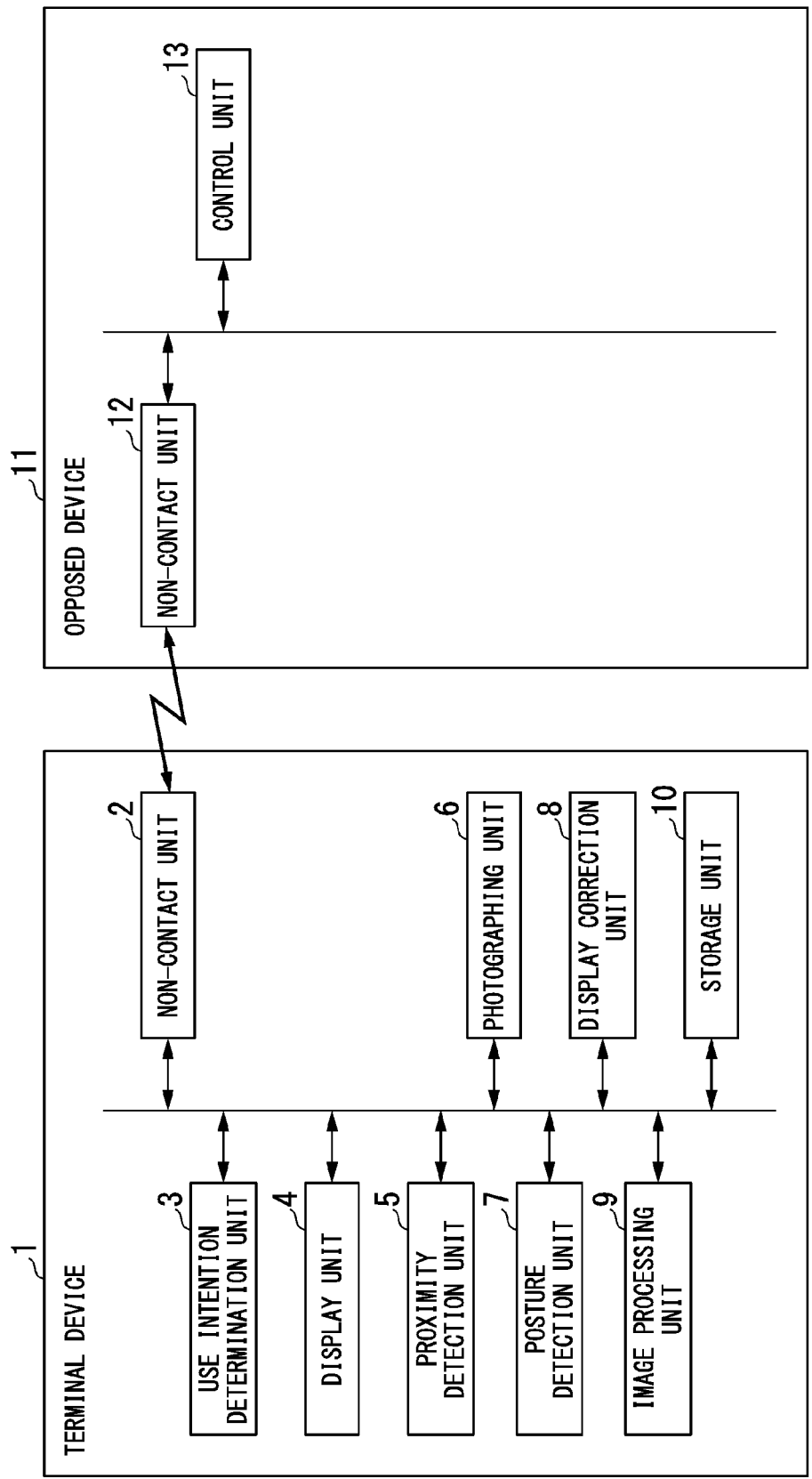
FIG. 13 is a functional block diagram showing a configuration when a posture detection function of the terminal device according to the second exemplary embodiment of the present invention is used.

FIG. 13 is a functional block diagram showing a configuration when a posture detection function of the terminal device 1 according to the second exemplary embodiment of the present invention is used.

As in the first exemplary embodiment, the posture detection unit 7 may be an acceleration sensor. In this case, the image processing unit 9 may use a movement distance and a movement direction of the terminal device 1 obtained from the acceleration detected by the posture detection unit 7 as information for combining image data. In addition, the user may use the movement distance and the movement direction of the terminal device 1 obtained from the acceleration detected by the posture detection unit 7 as information for alignment of the terminal device 1 and the opposed device 11.

The processing flow of the terminal device 1 according to the second exemplary embodiment has been described above. According to the above-described process of the terminal device 1, it is possible to perform alignment of the terminal device 1 and the opposed device 11 even for the terminal device 1 for which it is difficult to find the target mark 121 within the display unit 4.

Third Exemplary Embodiment

Figure 14:
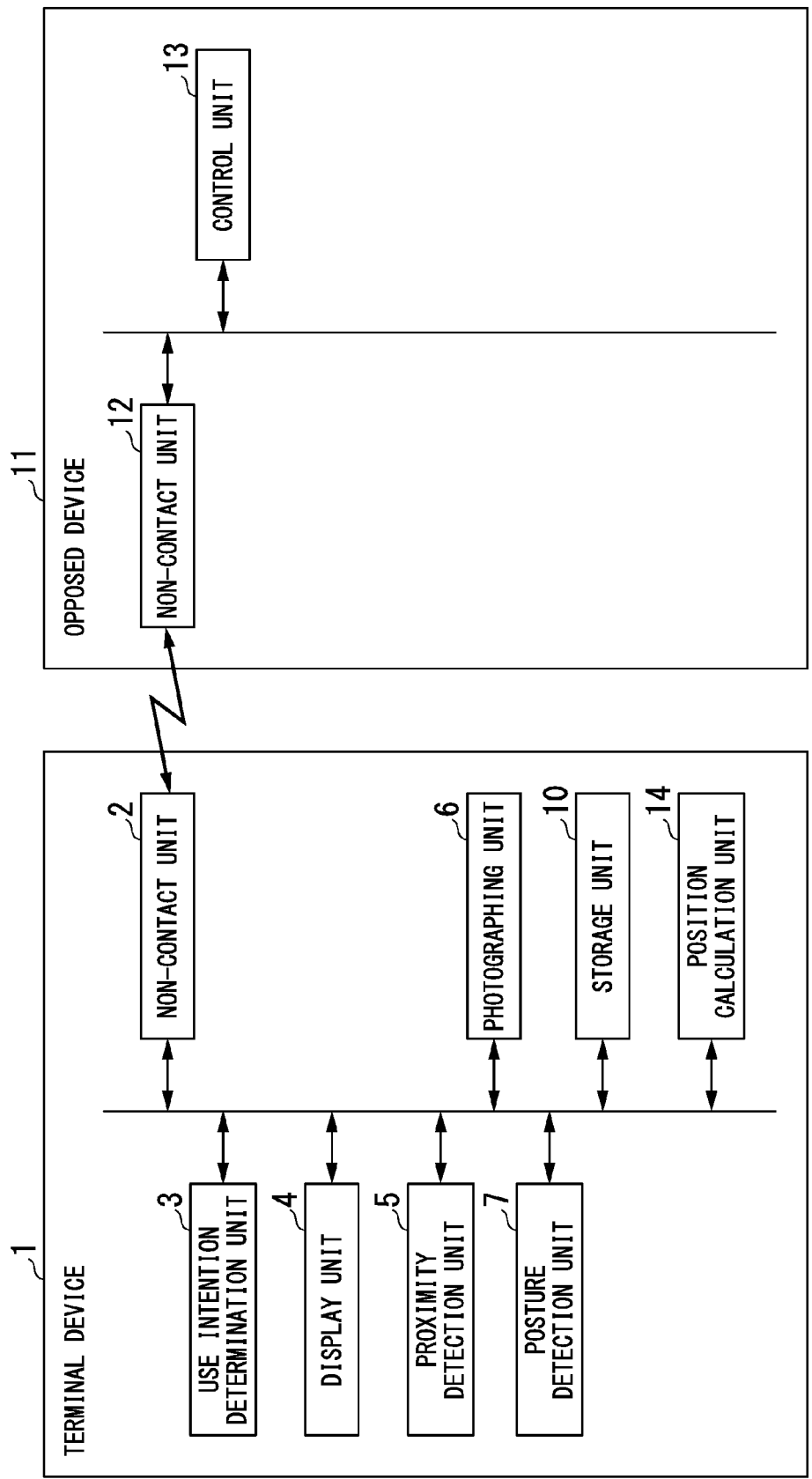
FIG. 14 is a functional block diagram showing a configuration of a terminal device according to a third exemplary embodiment of the present invention.

FIG. 14 is a functional block diagram showing a configuration of a terminal device 1 according to a third exemplary embodiment of the present invention.

The functional block diagram shown in FIG. 14 is a block diagram in which a position calculation unit 14 is added to the functional block indicating the configuration of the terminal device 1 in the first exemplary embodiment shown in FIG. 2.

In the configuration of the terminal device 1 according to the third exemplary embodiment, the posture detection unit 7, for example, may be an acceleration sensor. The acceleration sensor is used to measure a movement distance or direction when the user has moved the terminal device 1.

In the configuration of the terminal device 1 according to the third exemplary embodiment, the position calculation unit 14 is a functional unit for calculating the movement distance or direction from when a base point position (home position) has been decided using a detection result detected by the posture detection unit 7 (details will be described later).

By a control unit executing the program, the functional unit of the position calculation unit 14 is configured in the terminal device 1.

Figure 15:
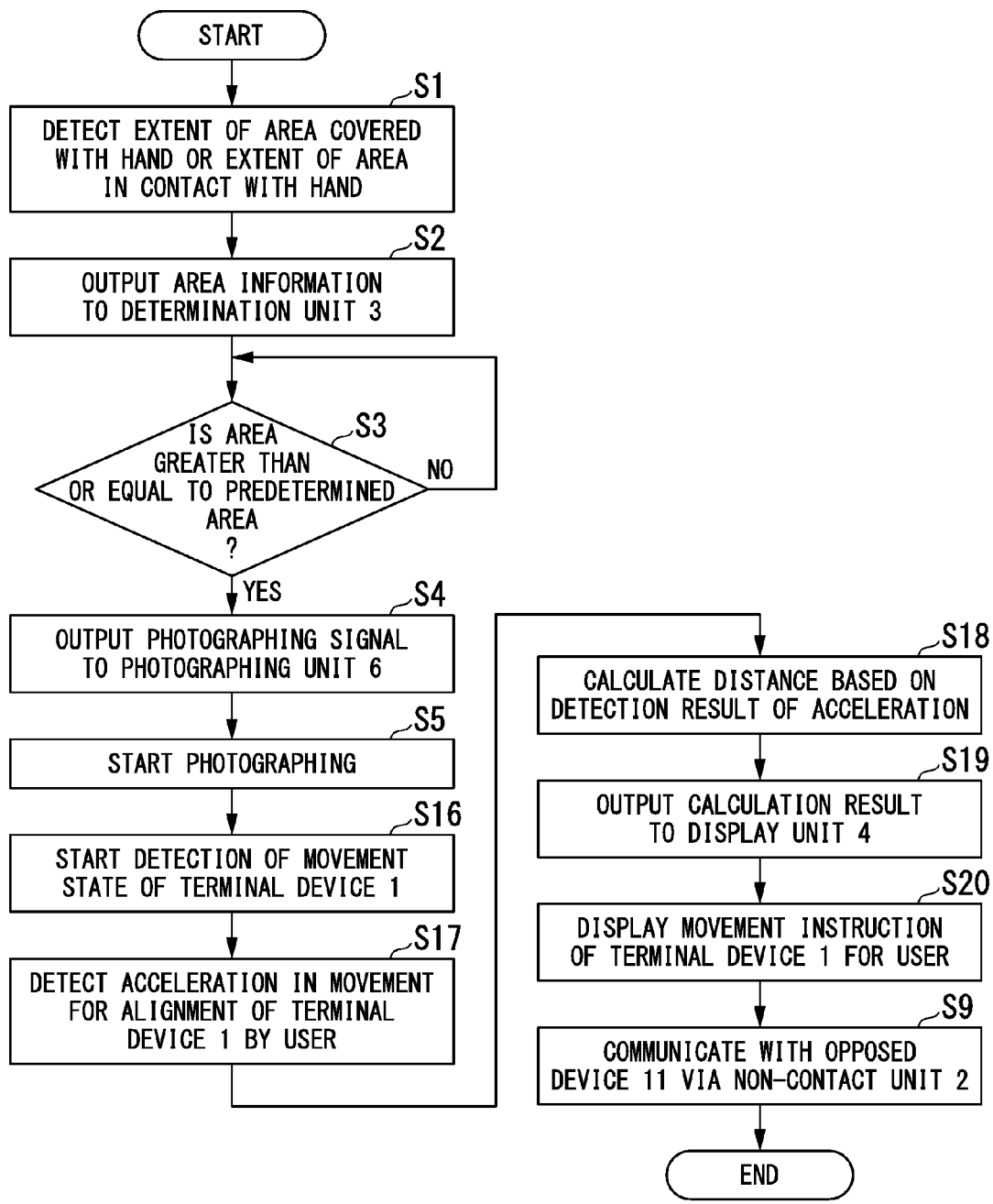
FIG. 15 is a diagram showing a processing flow of the terminal device according to the third exemplary embodiment of the present invention.

FIG. 15 is a diagram showing a processing flow of the terminal device 1 according to the third exemplary embodiment of the present invention.

As in the terminal device 1 according to the first exemplary embodiment, the processing flow of the terminal device 1 according to the third exemplary embodiment will be described with reference to an example in which the user pays money using the terminal device 1 provided with an electronic money function using a non-contact reception function at the time of shopping.

Except for steps S16 to S20 in the processing flow of the terminal device 1 according to the third exemplary embodiment of the present invention, it is the same as that of the terminal device 1 according to the first exemplary embodiment.

Hereinafter, steps S16 to S20 in the processing flow of the terminal device 1 according to the third exemplary embodiment of the present invention will be described.

Figure 16:
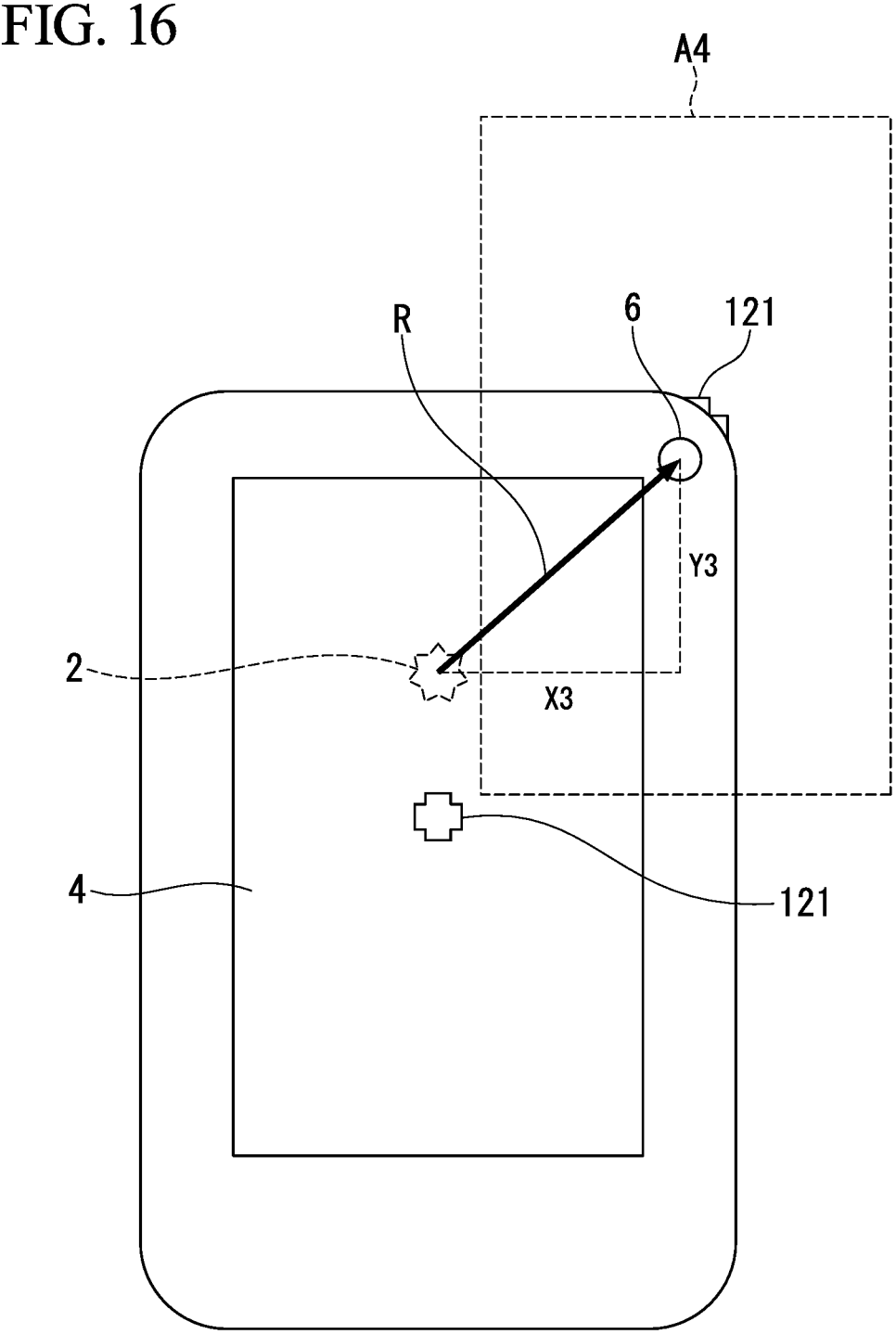
FIG. 16 is a diagram showing a display example of a display unit in the terminal device according to the third exemplary embodiment of the present invention.

FIG. 16 is a diagram showing a display example of the display unit 4 of the terminal device 1 according to the third exemplary embodiment of the present invention.

As in FIG. 4A, FIG. 16 shows a display example of the display unit 4 in a state in which the user has moved the photographing unit 6 provided in the terminal device 1 directly above the target mark 121 on a surface S of the opposed device 11.

First, the processing flow of the terminal device 1 of the third exemplary embodiment performs the process of steps S1 to S5 as in the first exemplary embodiment. Next, the user moves the terminal device 1 until the target mark 121 reaches a predetermined position of a photographing region A4 of the photographing unit 6. As a specific example, the user moves the terminal device 1 to a position at which the target mark 121 stays at the center of the photographing unit 6 as shown in FIG. 16.

Then, the user, for example, performs an operation of setting the position to a base point position according to a user operation such as an operation of touching the display unit 4. According to the user operation, the position calculation unit 14 of the terminal device 1 receives an input of a signal for recognizing the base point position as a calculation reference from the display unit 4. Next, the position calculation unit 14 starts detection of the movement state of the terminal device 1 (step S16).

At this time, positions of the photographing unit 6 provided in the terminal device 1 and the target mark 121 become positions at which they relatively face each other. In addition, a positional relationship between the photographing unit 6 and the non-contact unit 2 in the terminal device 1 is physically known. Accordingly, the user physically moves the terminal device 1 so that the non-contact unit 2 at the current time reaches a position of the photographing unit 6 at the current time as indicated by an arrow R (an offset between the non-contact unit 2 and the photographing unit 6) in FIG. 16. That is, if the user moves the terminal device 1 by a distance X3 in the horizontal direction and a distance Y3 in the vertical direction, the non-contact unit 2 and the target mark 121 are positioned to relatively face each other.

Accordingly, after the base point position is decided in step S16, the display unit 4 of the terminal device 1 instructs the user to move the terminal device 1 by the distance X3 in the horizontal direction and the distance Y3 in the vertical direction based on a calculation result of the position calculation unit 14.

Therefore, the posture detection unit 7, which is an acceleration sensor for example, detects the acceleration in movement for alignment of the terminal device 1 by the user and outputs the detection result of the acceleration to the position calculation unit 14 (step S17).

The position calculation unit 14 receives an input of the detection result of the acceleration from the posture detection unit 7. The position calculation unit 14, for example, calculates the distance based on the detection result of the acceleration by integrating the acceleration twice (step S18). The position calculation unit 14 outputs the calculation result to the display unit 4 (step S19).

The display unit 4 receives an input of the calculation result from the position calculation unit 14. The display unit 4, for example, indicates the movement direction of the terminal device 1 and its movement distance by numerical values and displays a movement instruction of the terminal device 1 for the user (step S20). A program necessary for this display is stored in the storage unit 10 in advance.

The display unit 4 may display and indicate the movement direction by an arrow in real time while the user moves the terminal device 1.

The position calculation unit 14 may read information in which movement data stored in the storage unit 10 is associated with instruction data such as audio data and output audio data associated with movement corresponding to a calculation result to a speaker of the display unit 4 or the like, and the display unit 4 may instruct the user to move the terminal device 1 by audio based on the audio data.

Then, in the processing flow of the terminal device 1 of the third exemplary embodiment, the process of step S9 is performed as in the first exemplary embodiment.

The processing flow of the terminal device 1 according to the third exemplary embodiment has been described above. According to the above-described process of the terminal device 1, the user can cause the non-contact unit 2 and the target mark 121 to face each other if the terminal device 1 is moved according to an instruction displayed on the display unit 4. As a result, it is possible to perform alignment of the terminal device 1 and the opposed device 11.

In the above-described exemplary embodiments of the present invention, some or all of the functions other than the non-contact reception function of the terminal device 1 may be temporarily stopped when the determination unit 3 determines that the user intends to use the non-contact reception function.

In the above-described exemplary embodiment of the present invention, when the determination unit 3 determines that the user intends to use the non-contact reception function, the reception of an operation input that is input from outside of the device (the terminal device 1) may be limited.

A computer system may be provided inside the terminal devices according to the above-described exemplary embodiments of the present invention. A process of the above-described processing may be stored in a computer-readable recording medium 70 in the form of a program, and the above-described process may be performed when the computer reads and executes the program. The computer-readable recording medium 70 includes a magnetic disk, a magneto-optical disc, a CD-ROM, a DVD-ROM, a semiconductor memory, or the like. The computer program may be distributed to the computer through a communication line, and the computer receiving the distribution may execute the program.

The above-described program may be used to implement some of the above-described functions.

The above-described program may be a so-called differential file (differential program) capable of implementing the above-described functions in combination with a program already stored in the computer system.

Although the present invention has been described with reference to the exemplary embodiments, the present invention is not limited to the above-described exemplary embodiments. Various modifications that can be appreciated by those skilled in the art may be made to the configuration or details of the present invention within the scope of the present invention.

This application is based upon and claims the benefit of priority from Japanese patent application No. 2012-226498, filed Oct. 12, 2012, the disclosure of which is incorporated herein in its entirety by reference.

INDUSTRIAL APPLICABILITY

The present invention is applicable to a terminal device, an information processing method, and a program.

REFERENCE SYMBOLS

1 Terminal device
2, 12 Non-contact unit
2b Non-contact unit mark
3 Use intention determination unit
4 Display unit
5 Proximity detection unit
6 Photographing unit
7 Posture detection unit
8 Display correction unit
9 Image processing unit
10 Storage unit
11 Opposed device
13 Control unit
14 Position calculation unit
121 Target mark
A1, A2, A3, A4 Photographing region
o1 Center of photographing region A1
o2 Center of display unit 4
o3 Center of image
o4 Position of photographing unit 6

What is claimed is:

1. A terminal device comprising:
a determination unit that determines whether a user intends to use a non-contact reception function based on information indicating a state of a terminal device to output a determination result;
a non-contact unit that receives and supplies at least one of a signal and an energy from and to an opposed device in a non-contact manner; and
a display unit that displays a mark to be used for alignment between the terminal device and the opposed device based on the determination result, the mark showing a virtual position of the non-contact unit.

2. The terminal device according to claim 1, further comprising:
a detection unit that detects an area in proximity to or in contact with a body of the user with respect to a predetermined region and outputs information indicating the detected area as the information indicating the state of the terminal device to the determination unit,
wherein the determination unit compares the detected area to a threshold value to determine whether the user intends to use the non-contact reception function.

3. The terminal device according to claim 1, further comprising:
a photographing unit that captures an image;
wherein the display unit corrects a display position of the mark based on a distance between a position of the non-contact unit and a position of the photographing unit and displays the mark in the corrected display position.

4. The terminal device according to claim 1, further comprising:
a photographing unit that captures at least first and second images;
a display correction unit that moves the first image so that a center of the first image is aligned with a position of the photographing unit; and
an image processing unit that combines the moved first image with the second image to obtain an image,
wherein the display unit displays the image obtained by the image processing unit.

5. The terminal device according to claim 1, further comprising:
a posture detection unit that detects movement of the terminal device to output a detection result; and
a position calculation unit that calculates at least one of a movement distance of the terminal device and a movement direction of the terminal device from a base point position using the detection result.

6. The terminal device according to claim 1, wherein the determination unit temporarily stops at least some functions of the terminal device excluding the non-contact reception function when the determination unit determines that the user intends to use the non-contact reception function.

7. The terminal device according to claim 1, wherein the determination unit limits reception of an operation input from outside of the terminal device when the determination unit determines that the user intends to use the non-contact reception function.

8. The terminal device according to claim 1,
wherein the non-contact unit receives and supplies at least one of a signal and an energy from and to the opposed device in a non-contact manner based on the determination result.

9. The terminal device according to claim 1, wherein the mark is to
be used for alignment with a target mark, the target mark being marked on a surface of the opposed device.

10. An information processing method comprising:
determining whether a user intends to use a non-contact reception function based on information indicating a state of a terminal device to output a determination result; and
receiving and supplying at least one of a signal and an energy from and to an opposed device in a non-contact manner; and
displaying a mark to be used for alignment between the terminal device and the opposed device based on the determination result, the mark showing a virtual position of the non-contact unit.

11. The information processing method according to claim 10, wherein the mark is to be used for alignment with a target mark, the target mark being marked on a surface of the opposed device.

12. A non-transitory computer-readable recording medium storing program that causes a computer of a terminal device to function as:
a determination unit that determines whether a user intends to use a non-contact reception function based on information indicating a state of the terminal device to output a determination result;
a non-contact unit that receives and supplies at least one of a signal and an energy from and to an opposed device in a non-contact manner: and
a display unit that displays a mark to be used for alignment between the terminal device and the opposed device based on the determination result, the mark showing a virtual position of the non-contact unit.

13. The recording medium according to claim 12, wherein the mark is to be used for alignment with a target mark, the target mark being marked on a surface of the opposed device.

* * * * *